United States Patent
Ivanov et al.

(10) Patent No.: US 9,396,334 B1
(45) Date of Patent: Jul. 19, 2016

(54) SYSTEM AND METHOD FOR DETECTING HARMFUL FILES EXECUTABLE ON A VIRTUAL STACK MACHINE

(71) Applicant: Kaspersky Lab ZAO, Moscow (RU)

(72) Inventors: Anton M. Ivanov, Moscow (RU); Alexander V. Liskin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/833,620

(22) Filed: Aug. 24, 2015

(30) Foreign Application Priority Data

Jun. 30, 2015 (RU) ................................ 2015125974

(51) Int. Cl.
*G06F 21/56* (2013.01)

(52) U.S. Cl.
CPC ........ *G06F 21/565* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,870,610 B1 * | 1/2011 | Mitchell et al. | 726/23 |
| 8,813,222 B1 | 8/2014 | Codreanu et al. | |
| 8,881,286 B2 | 11/2014 | Yu | |
| 2002/0038301 A1 * | 3/2002 | Aridor et al. | 707/10 |
| 2012/0017275 A1 * | 1/2012 | Harmonen | 726/24 |
| 2012/0151586 A1 * | 6/2012 | Hentunen | 726/24 |
| 2013/0340077 A1 | 12/2013 | Salsamendi et al. | |
| 2014/0165203 A1 * | 6/2014 | Friedrichs et al. | 726/24 |
| 2015/0052605 A1 * | 2/2015 | Yu | 726/23 |
| 2015/0067839 A1 * | 3/2015 | Wardman et al. | 726/22 |
| 2015/0096023 A1 | 4/2015 | Mesdaq et al. | |

FOREIGN PATENT DOCUMENTS

EP 2819054 A1 12/2014

* cited by examiner

*Primary Examiner* — Benjamin Lanier
(74) *Attorney, Agent, or Firm* — Arent Fox LLP; Michael Fainberg

(57) ABSTRACT

Disclosed are method and system for detecting harmful files executed by a virtual stack machine. An example method includes: identifying data from a file executed on the virtual stack machine, the data including parameters of a file section of the file and/or parameters of a function of the file; searching in a database for at least one cluster of safe files that contains at least one of: a value of the parameters of the file section exceeding a first threshold, and a value of the parameters of the function exceeding a second threshold; creating a cluster of data of the file based on the identified cluster of safe files; calculating a checksum of the created cluster of data of the file; and determining that the file is a harmful file if the computed checksum matches a checksum in a database of checksums of harmful files.

20 Claims, 3 Drawing Sheets

SYSTEM AND METHOD FOR DETECTING HARMFUL FILES EXECUTABLE ON A VIRTUAL STACK MACHINE

CROSS-REFERENCE TO RELATED APPLICATIONS

This application claims benefit of priority under 35 U.S.C. 119(a)-(d) to a Russian Application No. 2015125974 filed on Jun. 30, 2015, which is incorporated by reference herein.

FIELD OF TECHNOLOGY

The present disclosure relates generally to the field of computer security, and, more particularly, to a system and method for detecting harmful files on a virtual stack machine.

BACKGROUND

The turbulent development of computer technologies in the past decade and also the widespread use of diverse computing devices (e.g., personal computers, notebooks, tablets, smartphones and the like) have been a powerful stimulus to the use of these devices in diverse areas of activity and for a tremendous number of tasks (e.g., from Internet surfing to banking transfers and electronic document circulation). In parallel with the growth of the number of computing devices and the software running on these devices, the number of harmful programs (also known as malicious software or malware) has also grown significantly.

There are many different kinds of harmful programs. Some of them steal personal and confidential data from the devices of users, such as logins and passwords, banking information, electronic documents and the like. Others form so-called botnets from user devices for attacks such as denial of service (DDOS) or for sorting through passwords by brute force for other computers or computer networks. Still others offer paid content (e.g., adware) to users by intrusive advertising, paid subscriptions, sending of SMS to paid numbers, etc.

Specialized antivirus programs are used to fight harmful programs, that is, to detect harmful programs, prevent infection and restore the computer systems infected by harmful programs. In particular, antivirus programs employ various technologies to detect the full diversity of harmful programs, such as "signature analysis", which is a search for correspondences of a particular section of code of a program being analyzed with a known code (signature) from a database of signatures of harmful programs. Other technologies include "heuristic analysis", which is the emulation of the working of the program being analyzed, creating of emulation logs (i.e., containing data on API function calls, the parameters transmitted, the code sections of the program being analyzed, and so on), and searching for correspondences in the data of the created logs with the data from a database of emulations of harmful programs. Yet other technologies utilize "white lists" and "black lists", which includes searching for the calculated checksum of a program being analyzed (or portions thereof) in a database of checksums of harmful programs (black lists) or a database of checksums of legal programs (white lists). And finally, technologies use proactive protection by intercepting API function calls of a program being analyzed that is running in the system, creating of logs for the working of the program being analyzed (containing data on API function calls, the parameters transmitted, the code sections of the program being analyzed, and so on), and searching for correspondences in the data of the created logs with the data from a database of calls of harmful programs.

In turn, harmful programs are increasingly using methods to resist the detection by antivirus programs of their presence on infected computer systems. These techniques include code obfuscation to defeat signature analysis, i.e., giving the original text (such as that of scripts like JavaScript) or executable code of programs an appearance that preserves their functionality, yet resists analysis, understanding of the working algorithms, and their modification during decompilation. Moreover, harmful programs utilize more complicated behavior to defeat heuristic analysis, including the use of a large number of operations or API function calls whose use do not affect the results of the input/output working of the program, yet disrupts its emulation by antivirus programs. Finally, such programs also monitor the behavior of third party programs to defeat proactive protection, i.e., continual monitoring of the behavior of third party programs in the operating system, searching for antivirus programs and taking action against them (e.g., hiding or substituting their own code for the analysis).

By using various techniques, such as code generators (i.e., designer programs able to automatically create harmful programs having a specified functionality), obfuscators (i.e., programs able to alter the executable code of programs, thereby complicating their analysis without changing their functionality), packers (i.e., program modules introduced into programs, encrypting the executable code of the programs and decrypting it when launched), and so forth, hackers are able to quickly and effortlessly create and spread a large number of new versions of their harmful programs that are not detectable by antivirus applications.

For an effective detection of harmful programs obtained by the above-described methods, a technology is used whereby a group of harmful programs (i.e., a cluster) with certain characteristics (for example, files of harmful programs packed by one version of a packer, harmful programs having similar behavior, and so on) is collected. Moreover, in the files of the collected cluster, a search is made for similar code sections, data from emulation logs, or behavior (for example, a sequence of API function calls). Finally, rules of detection are created so that, if one knows the data of one harmful program of the cluster (such as code sections), other harmful programs of this cluster can also be detected.

One significant limitation of this approach is that there is no universal solution for detecting harmful files independently of the platform on which the harmful program is operating (for example, a mobile architecture ARM) or the type of data which the harmful program constitutes (such as a JavaScript script, a JavaScript byte-code or a compiled C++ code). Accordingly, it is often necessary to use algorithms individualized to the platform and the data type for the clustering and creation of rules for detection of harmful programs.

There are a large number of harmful programs actively utilizing virtual machines (and their vulnerabilities) for their propagation and destructive activity on the computers of users, and especially utilizing virtual stack machines (such as the Adobe Flash or Java virtual machine). The detection of such harmful programs involves additional difficulties as compared to the detection of ordinary harmful programs on PCs because the standard methods of detection are either not applicable (due to the architectural features of virtual machines) or are slow or inefficient (having too low a level of detection). Therefore, there is a need for more effective techniques for the detection of malware on virtual stack machines.

SUMMARY

Disclosed are systems, method and computer program products for detecting harmful files executable on a virtual stack machine. In one aspect, an exemplary method includes identifying, by a hardware processor, data from a file executed on the virtual stack machine, the data including at least one of parameters of a file section of the file and parameters of a function of the file executed by the virtual stack machine; based on the identified data, searching in a database, by the hardware processor, for at least one cluster of safe files that contains at least one of: a value of one of the parameters of the file section exceeding a first threshold, and a value of one of the parameters of the function exceeding a second threshold; creating, by the hardware processor, a cluster of data of the file executed by the virtual stack machine based at least partially on the identified at least one cluster of safe files; calculating, by the hardware processor, at least one checksum of the created cluster of data of the file executed by the virtual stack machine; accessing, by the hardware processor, a database of checksums of harmful files; and determining, by the hardware processor, that the file executed on the virtual stack machine is a harmful file if the computed at least one checksum matches a checksum in the database of checksums of harmful files.

In one example aspect, the parameters of the file section of the file include at least one of code, name, header type, offset to data in the file section, and a size of the data in the file section.

In one example aspect, the parameters of the function of the file include at least one of function body index, position and length of function code in the file section, function descriptor index, maximum depth of a stack when executing the function, a number of local variables used by the function, a name of the function, a number of operands, and a data type that can be returned.

In one example aspect, the first threshold is a number of types of file sections.

In one example aspect, the second threshold is a number of local variables being used by the function.

In one example aspect, the calculating of the at least one checksum comprises calculating a fuzzy checksum by computing a set MD5 that includes a cluster containing section header types and sizes of these sections, a cluster containing numbers of local variables used by the function of the file, and a cluster containing names of the function that is executable by the virtual stack machine.

In one example aspect, the determining that the file executable on the virtual stack machine is a harmful file comprises determining that at least two checksums of the clusters of the MD5 set match at least two checksums in the database of checksums of harmful files.

In one example aspect, the creating of the clusters of data of the file is performed according to rules of clustering, including at least one of arranging the identified data in consecutive clusters in an order of the data being identified from the file; not using the parameters of the file section to create the clusters of data if the size of the data of the file section is equal to zero; not using the parameters of the function of the file to create the clusters of data if a number of local variables being used by the function is equal to zero; and not using data identified from the clusters identified in the database of clusters of safe files to create the clusters of data.

In another aspect, an exemplary system for detecting a harmful file executed on a virtual stack machine includes: at least one database configured to store clusters of safe files and checksums of harmful files; and a hardware processor configured to: identify data from a file executed on the virtual stack machine, the data including at least one of parameters of a file section of the file and parameters of a function of the file executed by the virtual stack machine; based on the identified data, search in the database, for at least one cluster of safe files that contains at least one of: a value of one of the parameters of the file section exceeding a first threshold, and a value of one of the parameters of the function exceeding a second threshold; create a cluster of data of the file executed by the virtual stack machine based at least partially on the identified at least one cluster of safe files; calculate at least one checksum of the created cluster of data of the file executed by the virtual stack machine; access a database of checksums of harmful files; and determine that the file executed on the virtual stack machine is a harmful file if the computed at least one checksum matches a checksum in the database of checksums of harmful files.

In another aspect, an exemplary non-transitory computer readable medium storing computer executable instructions for detecting a harmful file on a virtual stack machine, including instructions for: identifying data from a file executed on the virtual stack machine, the data including at least one of parameters of a file section of the file and parameters of a function of the file executed by the virtual stack machine; based on the identified data, searching in a database for at least one cluster of safe files that contains at least one of: a value of one of the parameters of the file section exceeding a first threshold, and a value of one of the parameters of the function exceeding a second threshold; creating a cluster of data of the file executed by the virtual stack machine based at least partially on the identified at least one cluster of safe files; calculating at least one checksum of the created cluster of data of the file executed by the virtual stack machine; accessing a database of checksums of harmful files; and determining that the file executed on the virtual stack machine is a harmful file if the computed at least one checksum matches a checksum in the database of checksums of harmful files.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
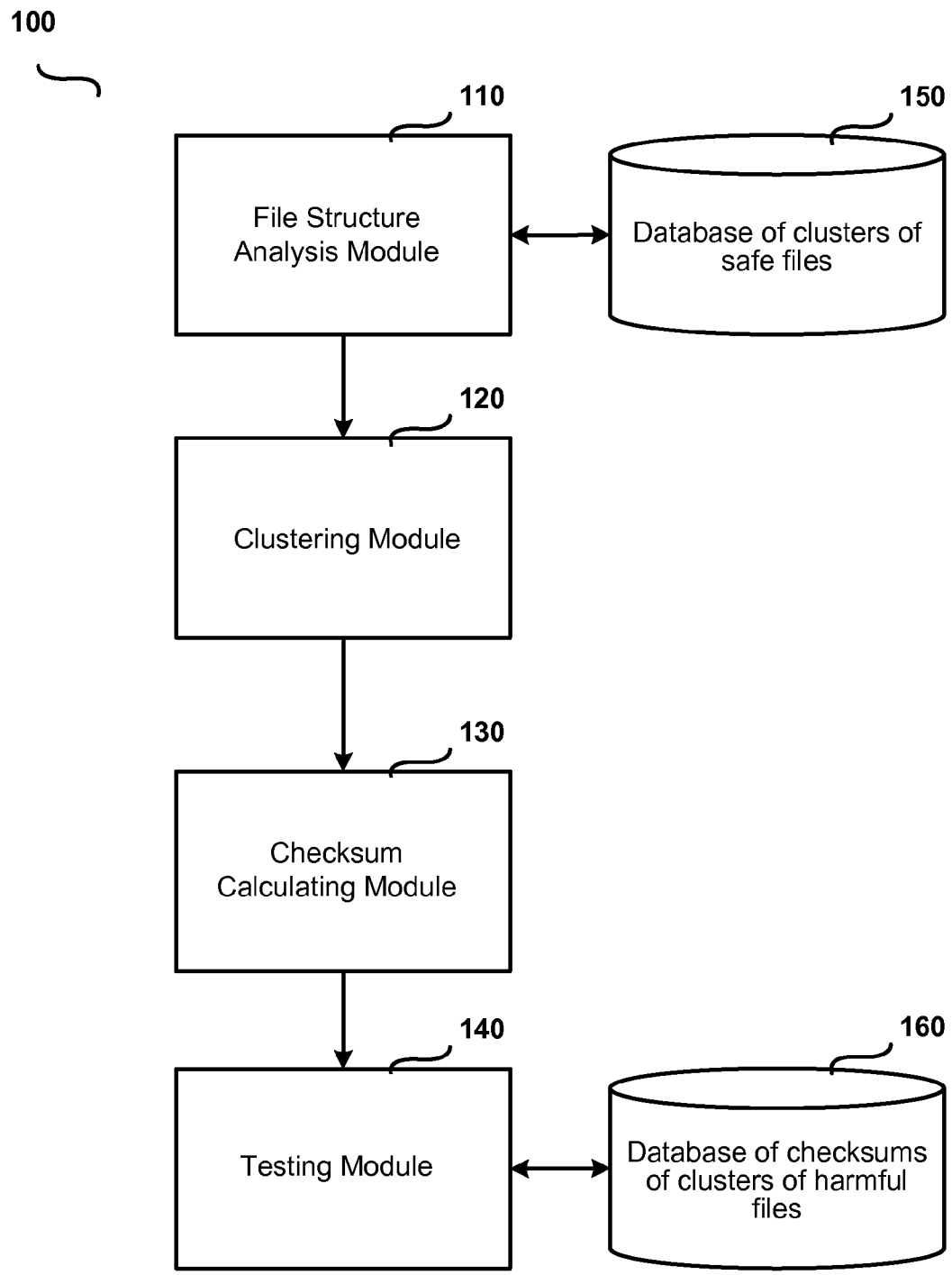
FIG. 1 illustrates a block diagram for detecting harmful files on a virtual stack machine according to an exemplary aspect.

Example aspects are described herein in the context of a system, method, and computer program product for detecting harmful files on a virtual stack machine. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following disclosure introduces a number of definitions and concepts that will be used in describing variant aspects of the disclosed system and method.

Antivirus program—a specialized program for detecting harmful programs and restoring the files infected (modified) by such programs, and also for prophylactics—prevention of infection (modification) of files or the operating system by a harmful program.

Safe program—a program not intended for user-unsanctioned destruction, blocking, modification or copying of information or disrupting the working of computers or computer networks.

Safe file—a file which is a component of a safe program.

Harmful program—a program specially designed for user-unsanctioned destruction, blocking, modification or copying of information or disrupting the working of computers or computer networks.

Harmful file—a file which is a component of a harmful program.

Virtual machine—a software or hardware system emulating the hardware of a certain target platform and executing programs for the target platform on a host platform or needed to provide virtualization of the hardware of a platform and creating environments on it which isolate programs and even operating systems from each other.

Virtual stack machine—a virtual machine in which all operands of the functions being executed are located in only one data structure, namely the stack of the virtual machine. Examples of virtual stack machines are the Java virtual machine, the Adobe Flash® virtual machine, or the common language execution environment .NET.

Cluster—an association of several homogeneous elements (e.g., the names of file sections), which can be treated as an independent unit having certain properties.

Clustering—a procedure of collecting data containing information on a sample of objects and subsequent ordering of the objects into relatively homogeneous groups.

Checksum (hash)—a value calculated for a set of data by using a particular algorithm (such as cyclical redundant code CRC32 or cryptographically strong algorithm MD5) and used for checking the integrity of data during its transmission or storage.

Fuzzy checksum (fuzzy hash)—a value calculated for a set of data and constituting a collection of checksums (such as MD5 or SHA256) calculated for certain selected parts of this data set.

FIG. 1 illustrates a block diagram of an exemplary system for detecting harmful files on a virtual stack machine. Generally, the system 100 processes files executable on a stack virtual machine to determine whether they are harmful or not. The system 100 may be implemented as a component of antivirus application configured to process certain types of file (i.e., files executable on a stack virtual machine). The antivirus application may be running on a stack virtual machine or on a physical machine, such as a PC or an antivirus server. In latter case, the antivirus application may not be interacting with virtual stack machines at all, but simply process files received from user computers or other devices or services.

As depicted, the system 100 includes a file structure analysis module 110, a clustering module 120, a checksum calculation module 130, a testing module 140, a database of clusters of safe files 150 and a database of checksums of clusters of harmful files 160.

According to one exemplary aspect, the file structure analysis module 110 is configured to identify files executable on a virtual stack machine based on, for example, the file extension (e.g., *.swf) or file header (e.g., "FWS"); analyze the structure of the identified the files; identify certain data from the analyzed file; perform a search for clusters in the database of clusters of safe files 150 based on the data identified from the analyzed file; identify certain data from the clusters found in the database of clusters of safe files 150; and transmit the data identified from the analyzed file executable by the virtual stack machine and clusters found in the database of clusters of safe files 150 to the clustering module 120.

According to the exemplary aspect, the file structure analysis module 110 is configured to identify certain data from the analyzed file, including, but not limited to, parameters of a file section, such as code, name, header type, offset to the data in the section, and size of the section data). Moreover, according to an exemplary aspect, the file structure analysis module 110 is also configured to identify other data including, but not limited to, parameters of the function executable by the virtual stack machine, such as function body index, position and length of the function code in the section, function descriptor index, maximum depth of the stack when executing the function, number of local variables used by the function, name of the function, number of operands, and data type which can be returned.

The file structure analysis module 110 extracts data from the analyzed file using the knowledge of the operation of virtual stack machines and information about the structure of the files executable on virtual stack machines. This knowledge of file structures of various files executable on virtual stack machines may be obtained by analyzing structures of different files, emulating certain elements (functions) of the file, and using other file analysis techniques.

According to the exemplary aspect, the file structure analysis module 110 is further configured to search for clusters in the database of clusters of safe files 150. The search for clusters can based on parameters of a file section, such as section code, section name, section header type, offset to the data in the section, and size of the section data, for example. In addition, the search for clusters can be based on parameters of the function executable by the virtual stack machine, such as function body index, position and length of the function code in the section, function descriptor index, maximum depth of the stack when executing the function, number of local variables used by the function, name of the function, number of operands, and data type which can be returned, for example.

According to one aspect, the file structure analysis module 110 is further configured to perform a search in the database of clusters of safe files 150, as per the data identified from the file executable by the virtual stack machine, for a cluster containing, for example, a value of one of the parameters of the file sections that exceeds a given threshold (for example, the number of types of sections of the file), and/or a value of one of the parameters of the functions executable by the virtual stack machine that exceeds a given threshold (for example, the number of local variables being used by the function).

Furthermore, according to the exemplary aspect, the clustering module 120 is configured to create clusters from the data obtained from the analysis module 110 using clustering rules and transmit the created clusters to the checksum calculation module 130.

According to one aspect, the clustering rules include, but not limited to, rules specifying that: the collected data should be arranged in clusters consecutively in the order of its identification from the file; the parameters of a file section should not be used in the forming of the clusters if the size of the section data of the file is equal to zero; the parameters of the function executable by the virtual stack machine should not be used in the forming of the clusters if the number of local variables being used by the function is equal to zero; and the data identified from the clusters which was found in the database of clusters of safe files should not be used in the forming of a cluster, for example.

According to the exemplary aspect, the checksum calculation module 130 is configured to calculate one or more checksums of the clusters obtained from the clustering module 120 and transmit the calculated checksums to the testing module 140.

According to one aspect, a checksum of a cluster may be one or more fuzzy checksums (such as MD5 or SHA256, for example) calculated from different types of data (such as the MD5 set of names of the file sections and of names of functions executable by the virtual stack machine) obtained from the analysis module 110.

According to the exemplary aspect, the testing module 140 is configured to perform a search for the checksums obtained from the checksum calculation module 130 in the database of checksums of clusters of harmful files 160; and detect a harmful file in the event of detecting as a result of the search in the database of checksums of clusters of harmful files 160 the checksums obtained from the checksum calculation module 130.

According to one aspect, the condition for detecting a fuzzy checksum obtained from the checksum calculation module 130 in the database of checksums of clusters of harmful files 160 is a condition whereby the number of matching checksums composing the fuzzy checksum obtained from the checksum calculation module 130 and those composing the fuzzy checksum stored in the database of checksums of clusters of harmful files 160 exceeds a given threshold.

Figure 2:
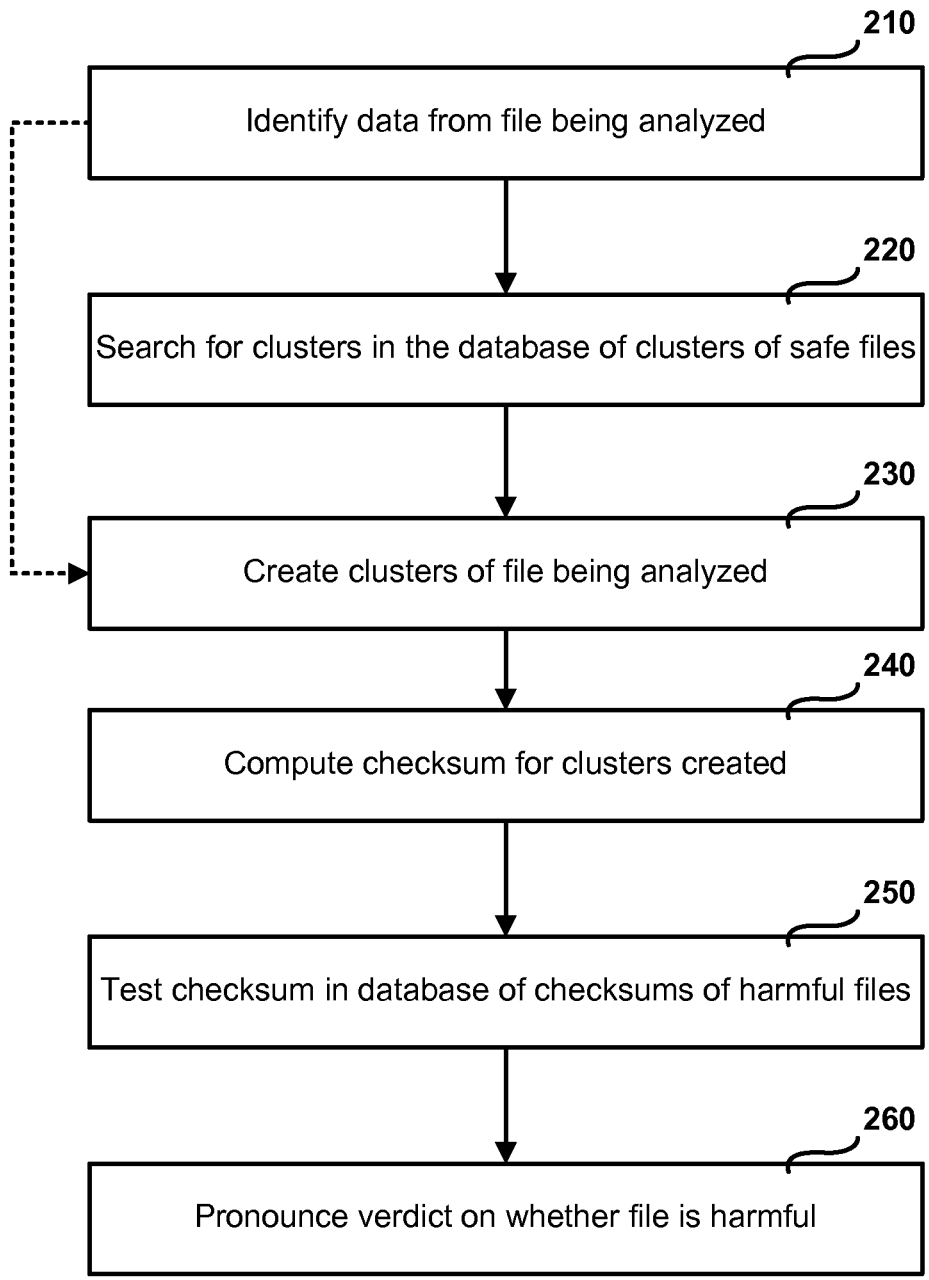
FIG. 2 illustrates a flowchart for a method for detecting harmful files on a virtual stack machine according to an exemplary aspect.

The following description provides an exemplary operation of the system illustrated in FIG. 2 of detecting harmful files executable by a virtual stack machine on the example of detecting the harmful file Adobe Flash®.

In particular, it is assumed that the file launchme.swf has arrived for analysis in order to detect a harmful file, containing in addition to multimedia resources (such as pictures, audio and video clips) also a code in ActionScript3 language. In this instance, the file structure analysis module 110 identifies data from file launchme.swf for analysis as explained above.

In one aspect, the data can include the parameters of file sections (code, name and section header type, offset to the data, and size of the section data), for example:
 code=69 (FileAttributes), type=short, offset=0x14, length=0x4
 code=9 (SetBackgroundColor), type=short, offset=0x1a, length=0x3
 code=82 (DoABC), type=long, offset=0x1f, length=0x1a2e According to an exemplary aspect, the data can include the parameters of the functions of the code in ActionScript3 language contained in the flash file which are executable by the virtual stack machine (function body index, position and length of the function code in the section, function descriptor index, maximum depth of the stack when executing the function, number of local variables used by the function, name of the function). For example:
 Method body 1: offset=0xd24, length=0xae, method=0, max_stack=0x3, local_count=0x1, exception_count=0x0, init_scope_depth=0x0, max_scope_depth=0x8, trait_count=0x0.
 script0$init( ):*

After the data is obtained, the file structure analysis module 110 is configured to search in the database of clusters of safe files 150 for clusters in which a series of parameters of the file sections (for example, code=69, type=short) and functions executable by the virtual stack machine (such as script0$init( )) coincides with the parameters of the sections and functions identified from the launchme.swf file being analyzed.

If the clusters of safe files found, the file structure analysis module 110 is configured to identify in the clusters of safe files the parameters of the sections (code, name and section header type, offset to the data, and size of the section data), for example:
 code=69 (FileAttributes), type=short, offset=0x14, length=0x4

Moreover, the file structure analysis module 110 is configured to identify the parameters of the functions executable by the virtual stack machine (function body index, position and length of the function code in the section, function descriptor index, maximum depth of the stack when executing the function, number of local variables used by the function, name of the function), for example:
 Method body 1: offset=0xc67, length=0xae, method=0, max_stack=0x3, local_count=0x1, exception_count=0x0, init_scope_depth=0x0, max_scope_depth=0x8, trait_count=0x0.
 script0$init( ):*

The identified data can then be sent to the clustering module 120. According to an exemplary aspect, the clustering module 120 may create three clusters from the data obtained from the analysis module 110:
- a cluster containing the section header types and the sizes of the section data (e.g., short, 0x4, short, 0x17, long, 0x2c, short, 0x5,)
- a cluster containing the number of local variables being used by functions executable by the virtual stack machine (e.g., 0x7, 0x5, 0x11, 0x7, 0xc, 0x2, 0xf, 0x5, 0x5, 0xa); and
- a cluster containing the names of the functions executable by the virtual stack machine (e.g., cript0$init, script0$read_data, script0$inject)

The created clusters contain data (i.e., the parameters of the sections and functions that are executable by the virtual stack machine) in the order of their identification from the file being analyzed, except for the data identified from the clusters found in the database of clusters of safe files 150, which were not included in the clusters being created. The created clusters can then be sent to the checksum calculation module 130.

According to the exemplary aspect, the checksum calculation module 130 is configured to compute the fuzzy checksum for the clusters received from the clustering module 120, that is, it computes the set MD5, consisting of the MD5 of a cluster containing the section header types and the sizes of these sections, a cluster containing the numbers of local variables used by the function, and a cluster containing the names of the functions which are executable by the virtual stack machine.

0xed4d37994bec687a9c31844e47928ec3
0xb07b30a8430a63ae8ef5bad369d653de
0xcaa351de76e20cff266d24b9b19ebdc1

The fuzzy checksum computed is then sent to the testing module 140. According to the exemplary aspect, the testing module 140 is configured to perform a search in the database of checksums of clusters of harmful files 160 for such a fuzzy checksum that would constitute a set of at least three MD5 checksums, at least two of which coincide with the MD5 checksums of the fuzzy checksum obtained from the checksum calculation module 130. If such a fuzzy sum is found, the testing module 140 will conclude that the analyzed file launchme.swf is harmful according to the exemplary aspect. It should be appreciated that the number of computed fuzzy checksums that match a checksum in database 160 can vary according to implementation designs of the system designer.

FIG. 2 illustrates a flowchart for a method for detecting harmful files on a virtual stack machine according to an exemplary aspect. As shown, initially at step 210, the file structure analysis module 110 identifies data from the file being analyzed. Next, at step 220, the file structure analysis module 110 performs a search for clusters in the database of clusters of safe files 150. As shown in step 230, the clustering module 120 is used to gather clusters of the file being analyzed. At step 240, the checksum calculation module 130 computes the checksum for the gathered clusters and, at step 250, the testing module 140 is used to test the checksum in the database of checksums of harmful files 150. Finally, at step 260, the testing module 140 makes a determination as to whether the file is harmful.

According to one aspect, in step 210, data is identified from the file being analyzed which is executable by the virtual stack machine. As described above, the data which can be identified in step 210 from the file being analyzed and executable by the virtual stack machine can include parameters of the file section and parameters of the function executable by the virtual stack machine.

Next, in step 220, a search is made in the database of clusters of safe files 150, as per the data identified in step 210 from the file being analyzed and executable by the virtual stack machine, for clusters containing, for example, a value of one of the parameters of the file sections that exceeds a given threshold (for example, the number of types of sections of the file); a value of one of the parameters of functions executable by the virtual stack machine which exceeds a given threshold (for example, the number of local variables being used by the function), and the data is identified from the clusters found.

As described above, the data which can be identified from the cluster found in the database of clusters of safe files 150 can include parameters of the file section and parameters of the function executable by the virtual stack machine.

Next, in step 230, with the help of the clustering rules, clusters of the file being analyzed are created.

Next, in step 240, the checksum is computed for the clusters created in step 230. The checksum computed for the cluster created in step 230 may be a fuzzy checksum. The fuzzy checksum computed for the cluster created in step 230 is a set of checksums (for example, MD5 or SHA256) from the various types of data identified in step 210 (such as a set MD5 of names of file sections and function names).

In step 250, the checksum is tested in the database of checksums of clusters of harmful files 160. The condition for detection of the fuzzy checksum obtained in step 240 in the database of checksums of clusters of harmful files 160 is a condition whereby the number of matching checksums composing the fuzzy checksum obtained in step 240 and those composing the fuzzy checksum stored in the database of checksums of clusters of harmful files 160 exceeds a given threshold.

Finally, in step 260, a determination is made as to whether the file being analyzed is harmful. In the event of detecting in step 250 the fuzzy checksum obtained in step 240 in the database of checksums of clusters of harmful files 160, it is determined that the file being analyzed is indeed harmful.

Figure 3:
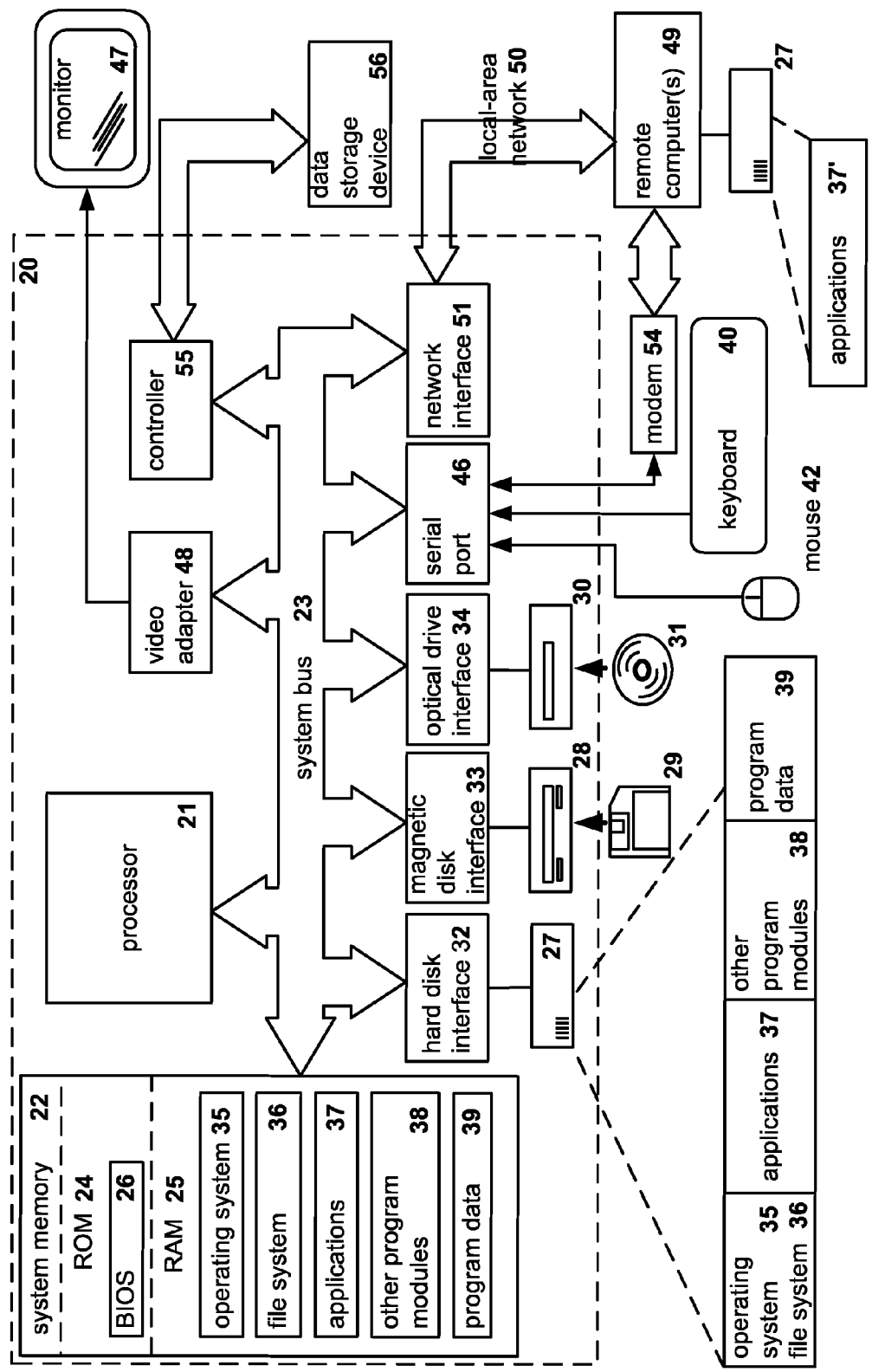
FIG. 3 illustrates an example of a general-purpose computer system on which the disclosed system and method can be implemented according to an example aspect.

FIG. 3 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

The invention claimed is:

1. A method for detecting a harmful file executed on a virtual stack machine, the method comprising:
   identifying, by a hardware processor, data from a file executed on the virtual stack machine, the data including at least one of parameters of a file section of the file and parameters of a function of the file;
   based on the identified data, searching in a database, for at least one cluster of safe files that contains a value of one of the parameters of the file section exceeding a number of local variables being used by the function;
   based at least partially on the identified at least one cluster of safe files, creating, by the hardware processor, at least one cluster of data of the file executed by the virtual stack machine, wherein at least one cluster of data includes a cluster containing section header types and sizes of these sections, a cluster containing numbers of local variables used by the function of the file, and a cluster containing names of the function that is executable by the virtual stack machine;
   calculating, by the hardware processor, a fuzzy checksum of the created cluster of data comprising one or more of a checksum of the cluster containing section header types and sizes of these sections, a checksum of the cluster containing numbers of local variables used by the function of the file, and a checksum of the cluster containing names of the function that is executable by the virtual stack machine; and
   determining, by the hardware processor, that the file executed on the virtual stack machine is a harmful file if the computed fuzzy checksum matches a checksum in a database of checksums of harmful files.

2. The method of claim 1, wherein the parameters of the file section of the file include at least one of code, name, header type, offset to data in the file section, and a size of the data in the file section.

3. The method of claim 1, wherein the parameters of the function of the file include at least one of function body index, position and length of function code in the file section, function descriptor index, maximum depth of a stack when executing the function, a number of local variables used by the function, a name of the function, a number of operands, and a data type that can be returned.

4. The method of claim 1, wherein the creating of the clusters of data of the file is performed according to rules of clustering, including not using the parameters of the file section to create the clusters of data if the size of the data of the file section is equal to zero.

5. The method of claim 1, wherein the creating of the clusters of data of the file is performed according to rules of clustering, including not using the parameters of the function of the file to create the clusters of data if a number of local variables being used by the function is equal to zero.

6. The method of claim 1, wherein the creating of the clusters of data of the file is performed according to rules of clustering, including not using data identified from the clusters identified in the database of clusters of safe files to create the clusters of data.

7. The method of claim 1, wherein the determining that the file executable on the virtual stack machine is a harmful file comprises determining that at least two fuzzy checksums of the created cluster match at least two checksums in the database of checksums of harmful files.

8. The method of claim 1, wherein the creating of the clusters of data of the file is performed according to rules of clustering, including arranging the identified data in consecutive clusters in an order of the data being identified from the file.

9. A system for detecting a harmful file executed on a virtual stack machine, the system comprising:
   at least one database configured to store clusters of safe files and checksums of harmful files; and
   a hardware processor configured to:
      identify data from a file executed on the virtual stack machine, the data including at least one of parameters of a file section of the file and parameters of a function of the file;
      based on the identified data, search in the database, for at least one cluster of safe files that contains a value of one of the parameters of the file section exceeding a number of local variables being used by the function;
      based at least partially on the identified at least one cluster of safe files, create at least one cluster of data of the file executed by the virtual stack machine, wherein at least one cluster of data includes a cluster containing section header types and sizes of these sections, a cluster containing numbers of local variables used by the function of the file, and a cluster containing names of the function that is executable by the virtual stack machine;
      calculate a fuzzy checksum of the created cluster of data comprising one or more of a checksum of the cluster containing section header types and sizes of these sections, a checksum of the cluster containing numbers of local variables used by the function of the file, and a checksum of the cluster containing names of the function that is executable by the virtual stack machine; and
      determine that the file executed on the virtual stack machine is a harmful file if the computed fuzzy checksum matches a checksum in a database of checksums of harmful files.

10. The method of claim 9, wherein the parameters of the file section of the file include at least one of code, name, header type, offset to data in the file section, and a size of the data in the file section.

11. The system of claim 9, wherein the parameters of the function of the file include at least one of function body index, position and length of function code in the file section, function descriptor index, maximum depth of a stack when executing the function, a number of local variables used by the function, a name of the function, a number of operands, and a data type that can be returned.

12. The system of claim 9, wherein the hardware processor is further configured to create the clusters of data of the file according to rules of clustering, including not using the parameters of the file section to create the clusters of data if the size of the data of the file section is equal to zero.

13. The system of claim 9, wherein the hardware processor is further configured to create the clusters of data of the file according to rules of clustering, including not using the parameters of the function of the file to create the clusters of data if a number of local variables being used by the function is equal to zero.

14. The system of claim 9, wherein the hardware processor is further configured to create the clusters of data of the file according to rules of clustering, including not using data identified from the clusters identified in the database of clusters of safe files to create the clusters of data.

15. The system of claim 9, wherein the hardware processor is further configured to determine that the file executable on the virtual stack machine is a harmful file by determining that at least two checksums of the fuzzy checksum match at least two checksums in the database of checksums of harmful files.

16. The system of claim 9, wherein the hardware processor is further configured to create the clusters of data of the file according to rules of clustering, including arranging the identified data in consecutive clusters in an order of the data being identified from the file.

17. A non-transitory computer readable medium storing computer executable instructions for detecting a harmful file on a virtual stack machine, including instructions for:
   identifying data from a file executed on the virtual stack machine, the data including at least one of parameters of a file section of the file and parameters of a function of the file;
   based on the identified data, searching in a database, for at least one cluster of safe files that contains a value of one of the parameters of the file section exceeding a number of local variables being used by the function;
   based at least partially on the identified at least one cluster of safe files, creating at least one cluster of data of the file executed by the virtual stack machine, wherein at least one cluster of data includes a cluster containing section header types and sizes of these sections, a cluster containing numbers of local variables used by the function of the file, and a cluster containing names of the function that is executable by the virtual stack machine;
   calculating a fuzzy checksum of the created cluster of data comprising one or more of a checksum of the cluster containing section header types and sizes of these sections, a checksum of the cluster containing numbers of local variables used by the function of the file, and a checksum of the cluster containing names of the function that is executable by the virtual stack machine; and
   determining that the file executed on the virtual stack machine is a harmful file if the computed fuzzy checksum matches a checksum in a database of checksums of harmful files.

18. The non-transitory computer readable medium of claim 17,
   wherein the parameters of the file section of the file include at least one of code, name, header type, offset to data in the file section, and a size of the data in the file section; and
   wherein the parameters of the function of the file include at least one of function body index, position and length of function code in the file section, function descriptor index, maximum depth of a stack when executing the function, a number of local variables used by the function, a name of the function, a number of operands, and a data type that can be returned.

19. The non-transitory computer readable medium of claim 18, wherein the instructions for determining that the file executable on the virtual stack machine is a harmful file further comprise determining that at least two checksums of the clusters of the fuzzy checksum match at least two checksums in the database of checksums of harmful files.

20. The non-transitory computer readable medium of claim 17, wherein the instructions for creating of the clusters of data of the file is performed according to rules of clustering, including at least one of arranging the identified data in consecutive clusters in an order of the data being identified from the file; not using the parameters of the file section to create the clusters of data if the size of the data of the file section is equal to zero; not using the parameters of the function of the file to create the clusters of data if a number of local variables being used by the function is equal to zero; and not using data identified from the clusters identified in the database of clusters of safe files to create the clusters of data.

* * * * *